(12) United States Patent
Harvill

(10) Patent No.: US 11,756,589 B2
(45) Date of Patent: *Sep. 12, 2023

(54) PROCESS FOR DEFINING, CAPTURING, ASSEMBLING, AND DISPLAYING CUSTOMIZED VIDEO CONTENT

(71) Applicant: Zazzle Inc., Redwood City, CA (US)

(72) Inventor: Young Harvill, El Granada, CA (US)

(73) Assignee: ZAZZLE INC., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/888,945

(22) Filed: Aug. 16, 2022

(65) Prior Publication Data

US 2022/0399043 A1 Dec. 15, 2022

Related U.S. Application Data

(63) Continuation of application No. 17/342,856, filed on Jun. 9, 2021, now Pat. No. 11,443,773, which is a
(Continued)

(51) Int. Cl.
*G11B 27/036* (2006.01)
*H04N 21/235* (2011.01)
(Continued)

(52) U.S. Cl.
CPC .......... *G11B 27/036* (2013.01); *G06T 19/006* (2013.01); *G11B 27/19* (2013.01);
(Continued)

(58) Field of Classification Search
None
See application file for complete search history.

(56) References Cited

U.S. PATENT DOCUMENTS 10,286,165 B2   5/2019   Matthews
11,443,773 B2 * 9/2022   Harvill ............. H04N 21/23418
(Continued)

OTHER PUBLICATIONS

Harvill, U.S. Appl. No. 15/785,015, filed Oct. 16, 2017, Office Action, dated Jul. 31, 2018.
(Continued)

*Primary Examiner* — Eileen M Adams
(74) *Attorney, Agent, or Firm* — Patterson & Sheridan LLP; Malgorzata A. Kulczycka

(57) ABSTRACT

An approach for defining, capturing, assembling, and displaying customized video content is provided. In an embodiment, a method comprises: receiving, by a server computer, a video frame sequence that includes one or more video frames; applying, by the server computer, one or more filters to the one or more video frames to generate a video data file that captures geometry of a customizable object depicted in the one or more video frames; generating, by the server computer, customization instructions for customizing appearance of the customizable object; transmitting, from the server computer to a client computer, the video data file and the customization instructions to cause the client computer to execute the customization instructions with respect to the video data file to render a customized object, and to overlay the customized object over the customizable object in the video frame sequence.

20 Claims, 10 Drawing Sheets

Related U.S. Application Data continuation of application No. 16/936,988, filed on Jul. 23, 2020, now Pat. No. 11,062,737, which is a continuation of application No. 16/733,904, filed on Jan. 3, 2020, now Pat. No. 10,726,875, which is a continuation of application No. 16/399,076, filed on Apr. 30, 2019, now Pat. No. 10,553,251, which is a continuation of application No. 15/785,015, filed on Oct. 16, 2017, now Pat. No. 10,283,165.

(60) Provisional application No. 62/414,534, filed on Oct. 28, 2016.

(51) Int. Cl.
    *H04N 21/81*     (2011.01)
    *G06T 19/00*     (2011.01)
    *G11B 27/19*     (2006.01)
    *H04N 21/234*     (2011.01)
    *H04N 21/8547*     (2011.01)

(52) U.S. Cl.
    CPC ..... *H04N 21/235* (2013.01); *H04N 21/23418* (2013.01); *H04N 21/816* (2013.01); *H04N 21/8146* (2013.01); *H04N 21/8166* (2013.01); *H04N 21/8547* (2013.01); *G06T 2210/16* (2013.01)

(56) References Cited

U.S. PATENT DOCUMENTS

| | | | |
|---|---|---|---|
| 2010/0138385 A1* | 6/2010 | Palermiti | G06F 16/1787 707/610 |
| 2011/0016195 A1 | 1/2011 | Kaplan et al. | |
| 2013/0195426 A1 | 8/2013 | Kamotaini | |
| 2017/0024614 A1 | 1/2017 | Sanil | |
| 2018/0054650 A1 | 2/2018 | Zhou | |
| 2018/0089194 A1* | 3/2018 | Kalish | H04N 21/85406 |
| 2018/0122424 A1 | 5/2018 | Harvill | |
| 2019/0259422 A1 | 8/2019 | Harvill | |
| 2020/0143840 A1 | 5/2020 | Harvill | |
| 2020/0357443 A1 | 11/2020 | Harvill | |
| 2021/0295873 A1 | 9/2021 | Harvill | |
| 2022/0392494 A1 | 12/2022 | Harvill | |

OTHER PUBLICATIONS

Harvill, U.S. Appl. No. 16/399,076, filed Apr. 30, 2019, Office Action, dated Jun. 20, 2019.

Harvill, U.S. Appl. No. 17/342,856, filed Jun. 9, 2021, Notice of Allowance and Fees Due, dated May 17, 2022.

Harvill, U.S. Appl. No. 17/342,856, filed Jun. 9, 2021, Non-Final Rejection, dated Apr. 25, 2022.

Harvill, U.S. Appl. No. 16/936,988, filed Jul. 23, 2020, Notice of Allowance, dated May 21, 2021.

Harvill, U.S. Appl. No. 16/733,904, filed Jan. 3, 2020, Office Action, dated Mar. 9, 2020.

Harvill, U.S. Appl. No. 16/733,904, filed Jan. 3, 2020, Notice of Allowance, dated Apr. 6, 2020.

Harvill, U.S. Appl. No. 16/399,076, filed Apr. 30, 2019, Notice of Allowance, dated Oct. 2, 2019.

Harvill, U.S. Appl. No. 15/785,015, filed Oct. 16, 2017, Notice of Allowance, dated Dec. 28, 2018.

Ostrowski, "WS-Objects: Extending Service-Oriented Architecture with Hierarchical Composition of Client-Side Asynchronous Event-Processing Logic", dated 2009.

\* cited by examiner

FIG. 3

PROCESS FOR DEFINING, CAPTURING, ASSEMBLING, AND DISPLAYING CUSTOMIZED VIDEO CONTENT

BENEFIT CLAIM

This application claims the benefit under 35 U.S.C. § 120 as a continuation of application Ser. No. 17/342,856, filed Jun. 9, 2021, which is a continuation of Ser. No. 16/936,988, filed Jul. 23, 2020, now U.S. Pat. No. 11,062,737, issued on Jul. 13, 2021, which is a continuation of Ser. No. 16/733,904, filed Jan. 3, 2020, now U.S. Pat. No. 10,726,875, issued on Jul. 28, 2020, which is a continuation of Ser. No. 16/399,076, filed Apr. 30, 2019, now U.S. Pat. No. 10,553,251, issued on Feb. 4, 2020, which is a continuation of Ser. No. 15/785,015, filed Oct. 16, 2017, now U.S. Pat. No. 10,283,165, issued on May 7, 2019, which claims the benefit under 35 U.S.C. 119(e) of provisional application 62/414,534, filed Oct. 28, 2016, the entire contents of which are hereby incorporated by reference for all purposes as if fully set forth herein. The applicants hereby rescind any disclaimer of claim scope in the parent applications or the prosecution history thereof and advise the USPTO that the claims in this application may be broader than any claim in the parent applications.

TECHNICAL FIELD

One technical field of the present disclosure is digital image processing. Another technical field is computer-implemented techniques for defining, capturing, assembling, and displaying customized video content using digital image processing to produce videos of customizable items more efficiently and using fewer resources.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

With growth of digital computation capabilities and enhancements in manufacturing processes, goods manufacturing is transforming into production of goods according to individual customization requests received from customer computers. For instance, manufacturers usually fulfill online orders received from the customers who use their computer systems to customize depictions of generic goods and place the online orders for the individually customized goods.

Generating customized video content usually requires pre-rendering multiple versions of the customized content and downloading the pre-rendered, customized content to customers' computers to let the customers choose a desirable customization. However, pre-rendering video in this manner may be time consuming and computationally expensive.

SUMMARY

The appended claims may serve as a summary of the invention.

BRIEF DESCRIPTION OF THE DRAWINGS

In the drawings:

FIG. 3 depicts an example markup;

DESCRIPTION OF EXAMPLE EMBODIMENTS

Figure 1:
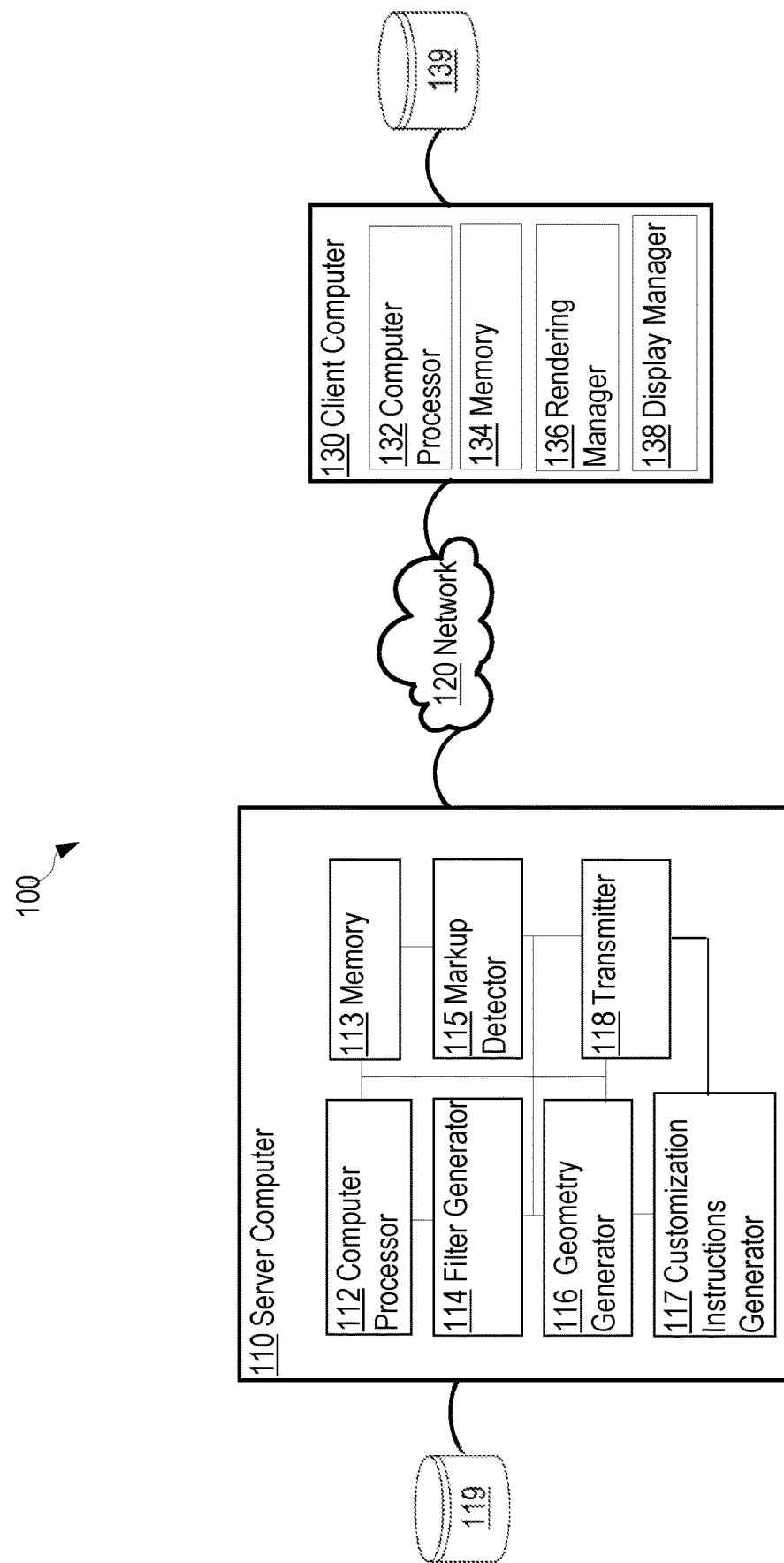
FIG. 1 depicts an example image processing computing system for defining, capturing, assembling, and displaying customized video content.

In the following description, for the purposes of explanation, numerous specific details are set forth in order to provide a thorough understanding of the present approach. It will be apparent, however, that the present approach may be practiced without these specific details. In other instances, well-known structures and devices are shown in block diagram form in order to avoid unnecessarily obscuring the present approach.

Embodiments are described herein according to the following outline:
  I. GENERAL OVERVIEW
  II. EXAMPLE IMAGE CUSTOMIZATION RENDERING SYSTEM
  III. PROCESS FOR DEFINING, CAPTURING, ASSEMBLING, AND DISPLAYING CUSTOMIZED VIDEO CONTENT
  IV. PLAYING INTERACTIVE, CUSTOMIZED VIDEO CONTENT
  V. EXAMPLE PROCESS FOR PLAYING INTERACTIVE, CUSTOMIZED VIDEO CONTENT
  VI. EXAMPLE MARKUP
  VII. EXAMPLE VIDEO FRAME CONTAINING AN EXAMPLE MARKUP
  VIII. EXAMPLE VIDEO FRAME WITH A SEGMENTED BACKGROUND
  IX. EXAMPLE VIDEO FRAME WITH A SEGMENTED PRODUCT AREA
  X. EXAMPLE VIDEO FRAME WITH A RECONSTRUCTED MARKUP
  XI. EXAMPLE VIDEO FRAME BEFORE AN EXAMPLE MARKUP IS REMOVED
  XII. EXAMPLE VIDEO FRAMES WITH EXAMPLE TIMECODES
  XIII. BENEFITS OF CERTAIN EMBODIMENTS
  XIV. IMPLEMENTATION MECHANISMS—HARDWARE OVERVIEW
  XV. EXAMPLE CODE INSTRUCTIONS

I. General Overview

In an embodiment, a computer-implemented approach enables defining, capturing, and assembling customizable video content. In an embodiment, a server computer generates instructions and geometry data for customizing objects that are included in an original video sequence. The geometry data and the instructions are transmitted to a client computer to cause the client computer to render and customize the objects depicted in the video sequence. In an embodiment, the server computer does not transmit to the client computer the entire, already customized video sequence. Instead, the server computer transmits to the client computer sufficient information to enable the client computer to render and customize the objects depicted in the video sequence.

In an embodiment, in response to receiving a video frame sequence, under program control the server computer generates video data file and customization instructions. The video data file specifies the geometry and deformations of an object that is to be customized in the video frame sequence. The customization instructions specify the object to be rendered, the colors, and the shadings to be used to customize the appearance of the rendered object. The server computer transmits the video data file and the customization instructions to a client computer to cause the client computer to execute the customization instructions on the video data file, and cause the client computer to render and customize the object in the video frame sequence.

One of several benefits of the approach is that it shortens rendering times required to customize video clips. Since a combined size of the video data file and the customization instructions is usually smaller than a size of the original video clip, transmitting the video data file and the customization instructions from a server computer to a client computer uses less bandwidth than transmitting the entire customized video clip from the server to the client. Providing media and instructions for the customization of a product video to the client computer offloads rendering and compression computation from the server to the client, effectively using the distributed processing to reduce interaction time and computation cost.

II. Example Image Customization Rendering System

FIG. 1 illustrates an example image processing computing system for defining, capturing, assembling, and displaying customized video content. In an embodiment, a computing system 100 includes a server computer 110, and a client computer 130. Server computer 110 and client computer 130 may communicate with each other, and potentially other servers and other clients, via one or more communications networks 120. The physical location of server computer 110 is not critical and it may broadly represent one or more programmed computers, processors, cores or clusters, or one or more virtual computing instances in private or public cloud computing environments.

Server computer 110 may be configured to generate geometry data and customization instructions for customizing objects included in an original video sequence. Server computer 110 may transmit the instructions and the geometry to client computer 130 to cause client computer 130 to render and customize the objects in the video sequence.

Server computer 110 may include one or more computer processors 112, one or more memory units 113, one or more filter generators 114, one or more markup detectors 115, one or more geometry generators 116, one or more customization instructions generators 117, and one or more communications transmitters 118. The filter generators 114, markup detectors 115, geometry generators 116, customization instructions generators 117, and communications transmitters 118 each may comprise one or more sequences of program instructions or other software elements that are stored in memory units 113. Computer processors 112 may be configured to execute program instructions stored in memory units 113, and/or store data in one or more database servers 119.

Filter generator 114 may be programmed or configured to receive a video frame sequence, identify individual frames in the sequence, and generate filters that are configured to detect objects depicted in the frames. The filters may be generated based on filter templates stored in memory units 113 and/or database servers 119. Examples of filters are described in detail in FIG. 2.

Markup detector 115 may be programmed or configured to receive a video frame, analyze the video frame, and determine whether the video frame includes markups. A markup may be a digital grid that includes grid squares, some of which are filled in with dots. The combination of the dots in the grid encodes a unique mask that allows detecting the markup. The markup may be embedded in an object depicted in the video frame. Markup detector 115 may scan the video frame to look for the markup to identify the object to be customized. Examples of markups are described in FIG. 3-4.

Geometry generator 116 is programmed or configured to receive a video frame, analyze the video frame, determine an object that is to be customized in the frame, and determine a vector data for the object in the frame. The object that is to be customized is referred to herein as a customizable object. A vector data for the video frame includes information about the geometry of the object. For example, a vector data may include information about the vertices and polygons that define the customizable object. The vector data may be stored for each frame in a vector data file. Examples of vector data files are described in FIG. 2.

Geometry generator 116 may also be configured to aggregate vector data generated for individual video frames, and store the aggregated vector data as a video data file in either memory 113 or database server 119. The video data file contains information that captures the geometry and movements of the object from one frame to another. It also captures the deformations of the object as the object is animated from one frame to another. The video data file is transmitted from server computer 110 to client computer 130. Client computer 130 uses the video data file to render a 3D object corresponding to the customizable object in the frames.

Customization instruction generator 117 is programmed or configured to generate customization instructions to be performed by client computer 130 to customize the appearance of a customizable object depicted in an original video frame sequence. The customization instructions may include the instructions for applying selected colors and/or shaders to the object. The customization instructions are transmitted from server computer 110 to client computer 130, and are used by client computer 130 to render and customize a 3D object. At client computer 130, the customized 3D object is overlaid over the customizable object in the video frame sequence. Examples of customization instructions are described in FIG. 2. The process for generating geometry, video and customization instructions needs only be performed once for a given product customization video. After processing, the result may be cached or stored by the server and retrieved based on a client request.

Transmitter 118 is programmed or configured to receive a video data file and customization instructions, and transmit them to client computer 130. The video data file may be received from for example, geometry generator 116. The customization instructions may be received from for example, customization instructions generator 117. The video data file and the customization instructions may be transmitted either directly to client computer 130, or indirectly to client computer 130 via one or more communications networks 120.

Client computer 130 may be configured to receive, from server computer 110, geometry data and customization instructions for customizing an object depicted in an original video sequence. Upon receiving the geometry data and the instructions, client computer 130 may execute the instructions to generate a customized object. The customized object may be overlaid over a customizable object depicted in the original video sequence.

Client computer 130 may include one or more computer processors 132, one or more memory units 134, one or more rendering managers 136, and one or more display managers 138. Computer processors 112 may be configured to execute program instructions stored in memory units 134, and/or store data in one or more database servers 139.

Rendering manager 136 may be programmed or configured to receive video data files and customization instructions from server computer 110. Upon receiving a video data file and customization instructions, rendering manager 136 may parse the received data to identify information about geometry, colors and shadings for a customized object. Then rendering manager 136 may use the identified information to render the customized object, and apply the colors and shaders to the rendered object. Once the object is customized, rendering manager 136 overlays the customized object over a customizable object in a video frame sequence. The process is repeated for all video frames in the sequence.

A process of overlaying a customized object over a customizable object includes synchronizing the frames depicting the customized object with the frames depicting the customizable object in the video sequence. The synchronization may be performed by matching digital codes depicted in the frames. The synchronization process is described in FIG. 2.

Display manager 138 may be programmed or configured to display the video frame sequence with the customized object overlaid over the customizable object in an original video frame sequence. For example, if the customizable object in the original video frame sequence was a red t-shirt, and the customized object was a blue t-shirt, then display manager 138 will display the video frame sequence featuring the blue t-shirt. The displayed blue t-shirt will have the same appearance as the red t-shirt in the original video in terms of warping, creases and lighting; however, it will appear as the blue t-shirt.

Figure 2:
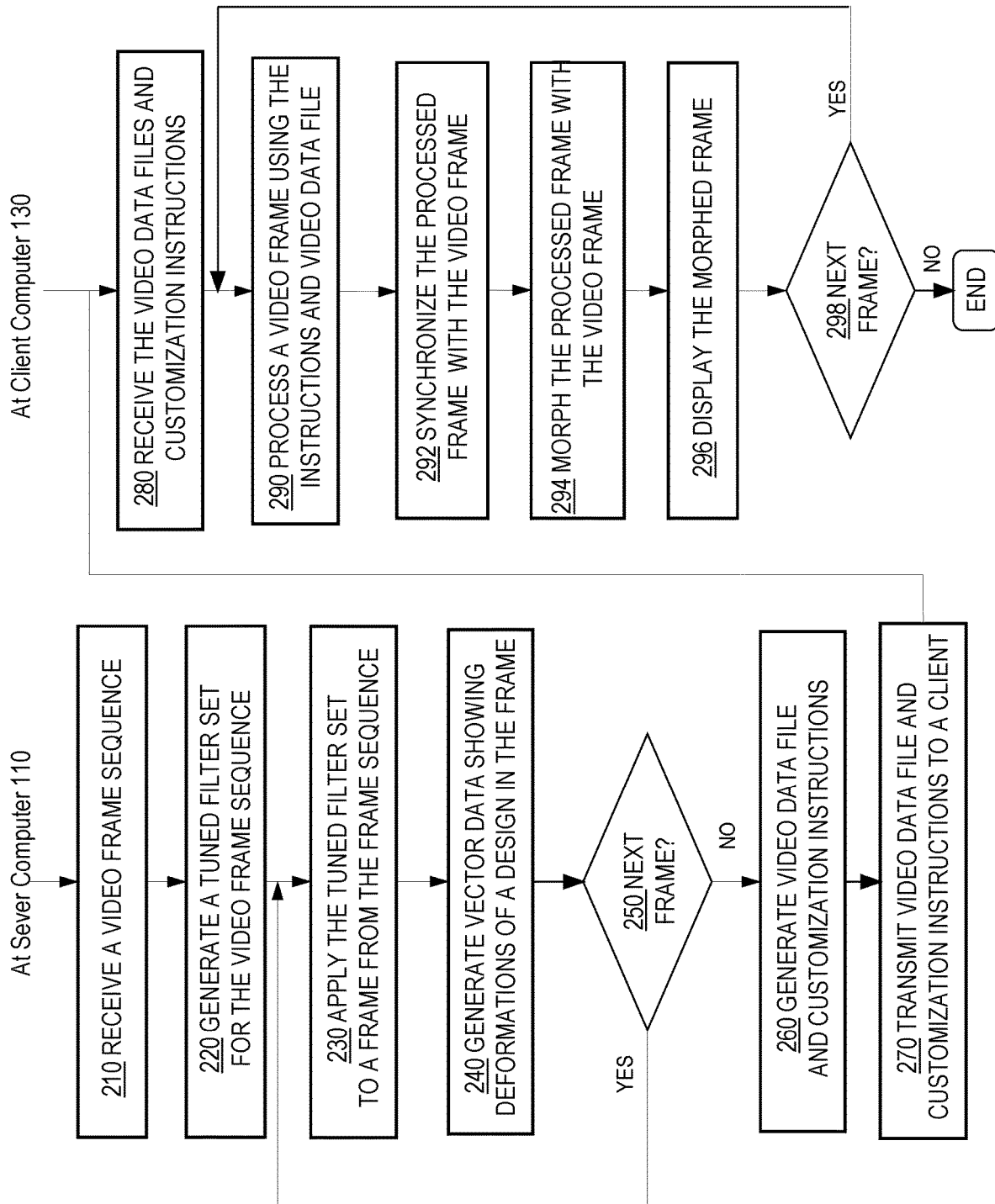
FIG. 2 depicts an example process for defining, capturing, assembling, and displaying customized video content.

III. Process for Defining, Capturing, Assembling, and Displaying Customized Video Content FIG. 2 illustrates an example process of defining, capturing, assembling, and displaying customized video content. In an embodiment, steps 210-270 are performed by server computer 110 or another computer on the server side that is configured to generate customization instructions and a video data file from an original video sequence for customization purposes. In an embodiment, steps 280-298 are performed by client computer 130, or any computer on the client side that is configured to execute the customization instructions with respect to the video data file to customize the video sequence, and to display the customized video sequence.

In step 210, server computer 110 receives a video frame sequence. The video frame sequence may include one or more video frames that are part of a video clip. A video clip may be a recording of a product to be customized and displayed on client computer 130. Non-limiting examples of the products include pieces of garment or apparel, shoes, toys, household items, and pieces of furniture. The video clip may feature for example, a person (a model) who is modeling a red t-shirt which is going to be customized to a blue t-shirt.

In step 220, server computer 110 generates a set of filters for a received video frame sequence. The set may include one or more computer-implemented filters. The filters may be applied to frames of the video frame sequence to determine, or identify, certain features or characteristics of objects depicted in the frames. The set may include for example, a filter for performing a background segmentation on a video frame to identify characteristics of the background depicted in the frame. The set may also include a filter for replacing the color of the background in the video frame with another color. Furthermore, the set may include a filter for recognizing a markup in a video frame, a filter for removing the design markup area from the video frame, and/or a filter for removing errors caused by recording inconsistencies that occurred when the video clip was produced. The set of filters that is specifically selected, or tuned, for the received video frame sequence is also referred to as a tuned filter set.

Figure 4:
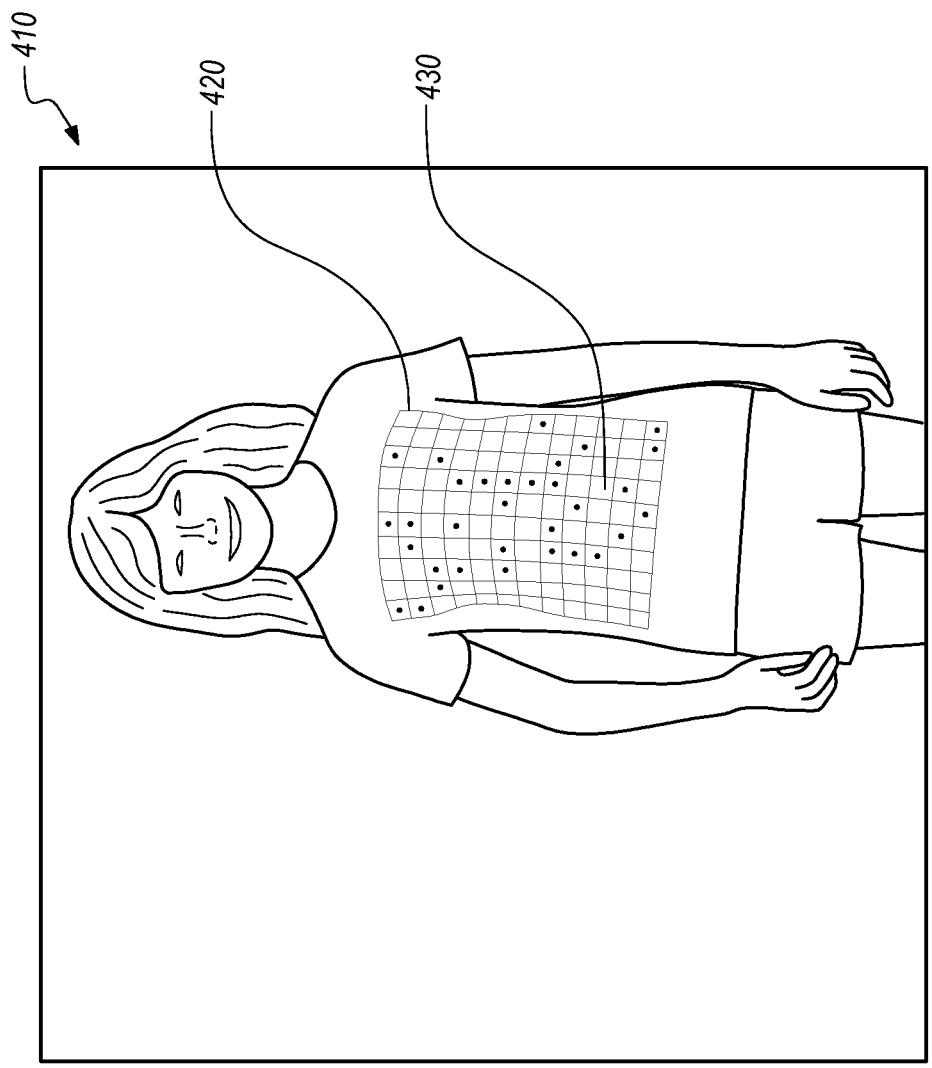
FIG. 4 depicts an example video frame containing an example markup.
Figure 5:
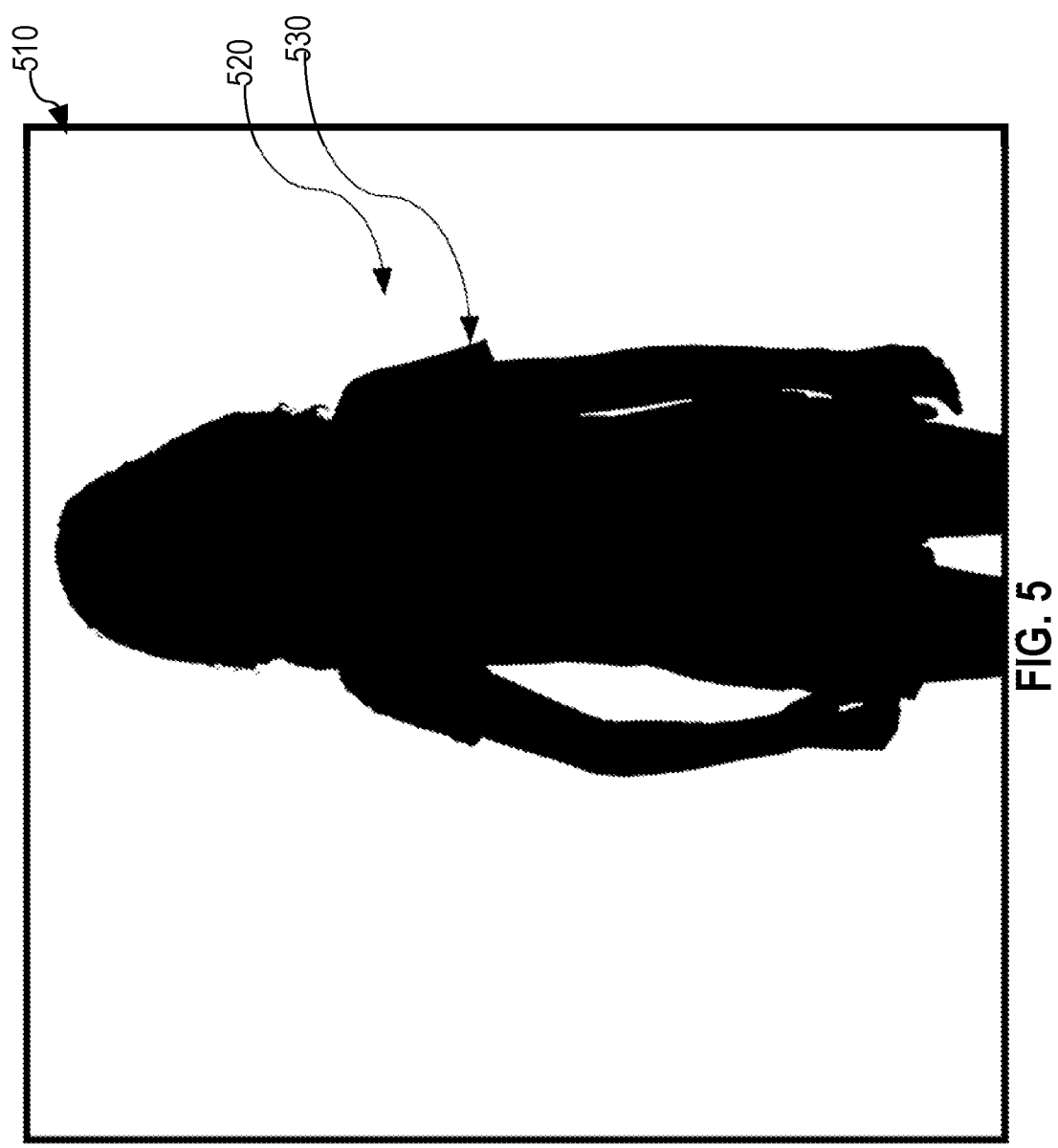
FIG. 5 depicts an example video frame with a segmented background.
Figure 6:
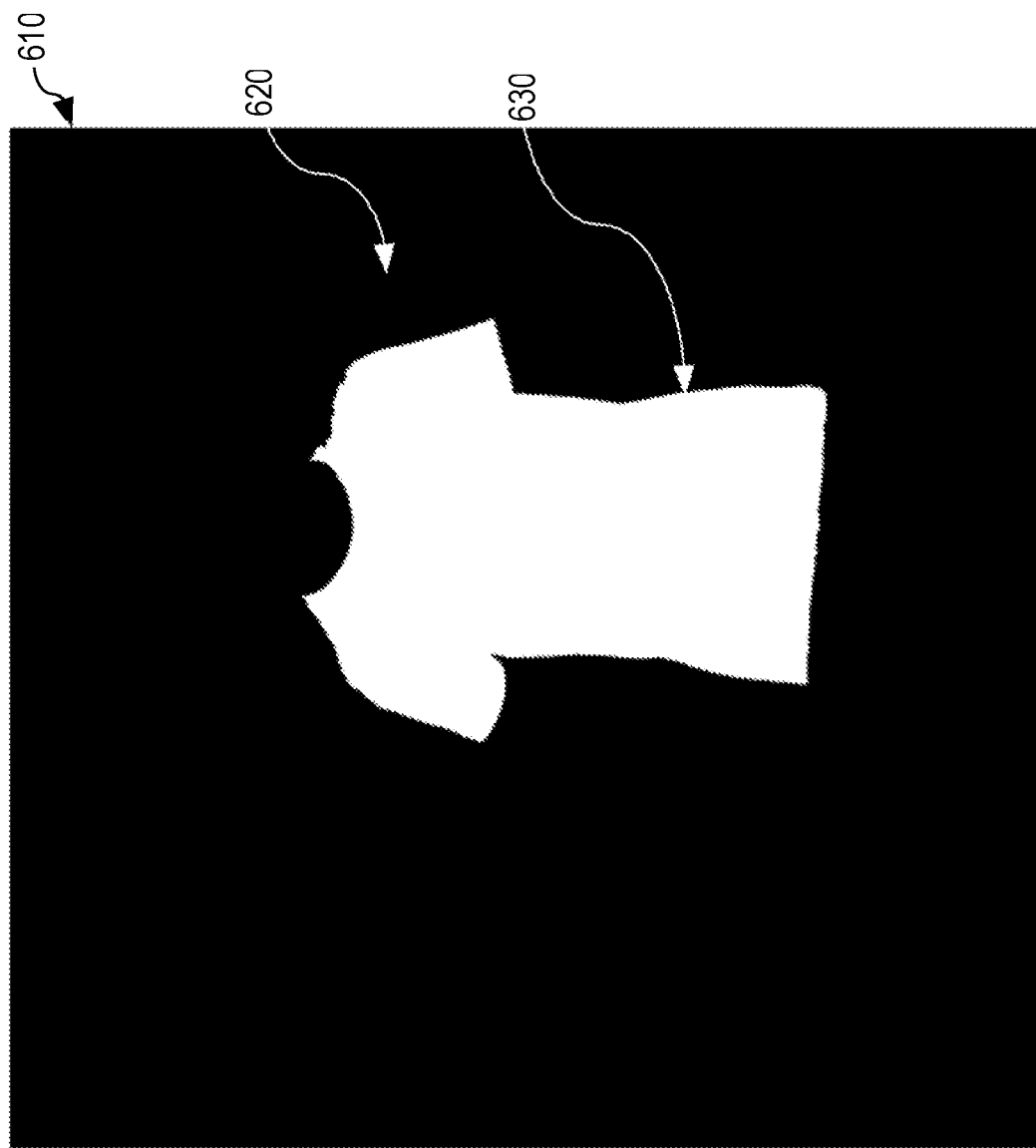
FIG. 6 depicts an example video frame with a segmented product area.

In step 230, server computer 110 applies filters from a tuned filter set to a video frame from the video frame sequence. This may include applying the filters to the video frame to segment a background region depicted in the frame. An example of segmenting a background is depicted in FIG. 5. This may also include segmenting an apparel product depicted in the frame. An example of segmenting a depiction of a t-shirt is shown in FIG. 6. This may also include recognizing a markup in the frame. An example of recognizing a markup is depicted in FIG. 4.

In step 240, server computer 110 generates vector data for a video frame from a video frame sequence. Vector data captures results of applying filters to the video frame. It may include information about vertices and geometry of a customizable object depicted in the frame and deformation parameters of the customizable object. The vector data may be stored in any type of data file, including a vector data JSON-type file.

In step 250, server computer 110 determines whether there is any other frame in a video frame sequence that has not been processed yet. If another frame is found, then a tuned filter set is applied to that frame in step 230. Otherwise, step 260 is performed. By the time step 260 is performed, server computer 110 has completed generating vector data for all video frames in the video frame sequence.

In step 260, server computer 110 generates a video data file and customization instructions for a video frame sequence. A video data file is generated from vector data files obtained for the frames in the video frame sequence. The video data file may be generated by for example, aggregating the vector data into one video data file.

A video data file may be viewed as a motion file, or as a moving vector data file that captures geometry, deformations and animations of a customizable object in a video frame sequence. The video data file may be used to generate a customized object which in turn may be overlaid over the customizable object in the video sequence. For example, the video data file generated for a few frames may be used to mask the regions in the video frames in which the customizable object is depicted, and to generate a customized object that is overlaid over the masked regions in the video sequence. A video data file may be a JSON-type file.

A resulting overlay may be written out to a new video frame and displayed. For example, if a particular video frame from the video frame sequence depicted a red t-shirt, and a customization request indicated that a viewer wished to see a blue t-shirt, then the video data file may include a prescription for masking, in the frames, the regions in which the red t-shirt was depicted. The video data file may also include a prescription for generating the geometry, deformations and warping of the t-shirt, customizing the t-shirt with the blue color, and overlaying the customized blue t-shirt over the original red-t-shirt.

Customization instructions may include instructions for generating a customized object. The customization instructions may include instructions for using a video data file to generate geometry of the customized object, to generate deformations and warping of the customized object, and to morph the generated customized object with frames of the original video frame sequence. The customization instructions may include a JavaScript code, WebGL code, WebGL shading language code, code based on JavaScript libraries, and other information that client computer 130 may use to render and display the customized object.

Customization instructions may be stored in any type of data file, including an HTML5 file. An example HTML5 file that includes the customization instructions is referred to herein as "The Player." The Player may be executed on client computer 130 to customize the appearance of a customizable object by generating a customized object and overlaying the customized object over a customizable object in the video sequence.

In step 270, server computer 110 transmits at least the video data file and the customization instructions (The Player) to client computer 130. Server computer 110 may transmit the video data file and the customization instructions to client computer 130 either directly or indirectly. Transmitting indirectly includes for example, storing, by server computer 110, the video data file and the customization instructions on a web server at a particular location at a particular URL address, and transmitting the particular URL address to client computer 130.

In step 280, client computer 130 receives the video data file and the customization instructions which collectively may comprise an executable video player. Client computer 130 may receive them directly from server computer 110, or may download them using an URL address provided to client computer 130 by server computer 110.

In step 290, client computer 130 executes the customization instructions on the video data file to generate a customized object. The customization may include reading the video data file, instantiating geometry with morph targets, selecting shaders for the geometry, and generating the customized object as prescribed in the customization instructions. This may also include adding a background around the customized object, and saving the depiction of the background and the customized object as a processed frame.

In step 292, the processed frame is synchronized with a particular video frame in the video frame sequence. This may be performed by identifying a certain code depicted at a certain location in the processed video frame, and searching for a particular video frame in the video sequence that has the same certain code. The certain code may be a graphical, binary, black-and-white representation of a frame number in the video frame sequence. The synchronization allows pairing the processed frame with the particular video frame from the image frame sequence. Once the pair is found, the processed frame is morphed with the particular video frame in the image video sequence.

One of the reasons that a processed image and a particular image need to be synchronized is that it is difficult to predict the speed at which the frames of the image frame sequence are played on client computer 130. For example, it may happen that client computer 130 displays some frames faster than others, and thus it is hard to predict whether a corresponding frame from the image sequence is queued by the time the processed image is ready. By identifying a certain code in the processed frame and scanning the image frame sequence for the certain frame that has the same certain code, the synchronization issue may be resolved.

In step 294, client computer 130 morphs the processed image with the particular video frame. Morphing of the two frames may include overlaying the processed image over the particular video frame. The resulting image is referred to as a morphed frame.

In step 296, client computer 130 displays the morphed frame on a display device. The displayed frame may depict the customized product. For example, if an original image frame sequence depicted a red t-shirt, and the customization included replacing the red color with the blue color, then the displayed frame depicts the blue t-shirt. Customization may also include customizing fabrics of the displayed object, the texture patterns depicted on the displayed object, and so forth.

IV. Playing Interactive, Customized Video Content

Playing interactive, customized video content may involve interactions between a server computer and a client computer. The interactions may be enabled by providing functionalities to the client computer to allow specifying customization details for customizing an object depicted in a video frame sequence, and sending the customization details to the server computer. On the server side, the interactions may be enabled by providing functionalities to the server computer to receive the customization details, use the customization details to generate video data files and customization instructions, and send the video data files and the customization instructions to the client computer. Upon receiving the data files and the instructions, the client computer may use them to customize the object and display the customized object in the video frame sequence.

In an embodiment, customizing video content is performed by specifying what portion of the video is to be customized, and how the specified portion of the video is to by customized. For example, the customization may include specifying that a t-shirt depicted in a video frame sequence is to be customized, and that the customization include rending the t-shirt in blue. The video frame sequence may depict a person modeling a white t-shirt, as it is shown in FIG. 4, described later. The customization allows replacing the depiction of the white t-shirt with a depiction of a blue t-shirt. However, since the t-shirt will be generated using a 3D rendering technique, all the warping and creases of the t-shirt will have darker shades of blue than other parts of the t-shirt. Further, the depiction will capture all highlights and reflections if such are shown on the t-shirt. Hence, the approach goes far beyond just replacing one color with another color an object depicted in the video.

Another unique feature of the approach is that the actual rendering of the customized video content takes place on a client computer, not on a server computer. The server computer is configured to generate a customization prescription, and transmit the prescription to the client computer. It is the client computer that is preforming the actual rendering of the customized content for a viewer. The prescription, in an embodiment, may comprise a video data file and customization instructions.

In sharp contrast, other approaches require that video content be customized on a server side, and the entire customized video content be transmitted from the server computer to a client computer. That puts significant demands on communications bandwidth, and thus it may be inefficient and slow.

In an embodiment, significant savings are achieved in terms or bandwidth because customization instructions and video data files are usually much smaller in size than the actual rendered customized video content. Transmitting the customization instructions and the video data files from a server computer to a client computer is less taxing on bandwidth than transmitting the entire customized video content.

V. Example Process for Playing Interactive, Customized Video Content

In an embodiment, a process starts when a client computer receives a request for customizing a video clip. The request may be received via any type of user interface, including a graphical user interface or command line interface. The client computer may receive an identification of the video clip, identifiers of customization options, identifiers of customization colors, and the like.

Upon receiving the customization request, the client computer transmits the customization request to a server computer. The client computer may also transmit the video clip to the server computer, or provide an identifier of the video clip so that the server computer may retrieve the video clip from a content repository.

Upon receiving the customization request, the server computer downloads the video clip and parses the customization request. The video clip may depict a customizable object that has an embedded markup. The customizable object may be for example, a red t-shirt featured in the video clip, and the customization request may specify that a viewer wishes to see that t-shirt in blue.

Based on the content of the request and the content of the video clip, the server computer may generate vector data files for frames of the video clip. For a given video frame, a vector data file may include information that indicates vertices of a design area in which the customizable object is depicted. The vector data file may also include deformation parameters of the depicted design area. The vector data file may be any type of data file, including a vector data JSON-type file.

The server may aggregate the vector data files into a video data file, and generate customization instructions for generating a customized object. A video data file may be a video data JSON file. Customization instructions may include a collection of HTML5 instructions, JavaScript code, WebGL shading language code, WebGL code, and certain JavaScript libraries.

The video data file, and the customization instructions may be generated using for example, steps 210-260 depicted in FIG. 2.

The video data file and the customization instructions may be transmitted directly to the client computer. Alternatively, the server computer may store the video data file and the customization instructions in a web-based database at a particular URL address, and transmit to the client computer the URL address pointing to the stored video data files and the customization instructions.

Upon receiving, or retrieving, the video data files and the customization instructions, the client computer stores the information, and starts executing the customization instructions on the video data file. The information may be stored in the client computer's cache, and the video clip may be buffered.

Executing the customization instructions may include using the video data file to generate the geometry for the customized object, generating deformations of the geometry, and applying colors and shaders to the customized object. For example, the video data JSON file may be read, and the geometry with morph targets may be instantiated. Then the textures and shaders are constructed, and bound to the selected shaders.

Figure 9:
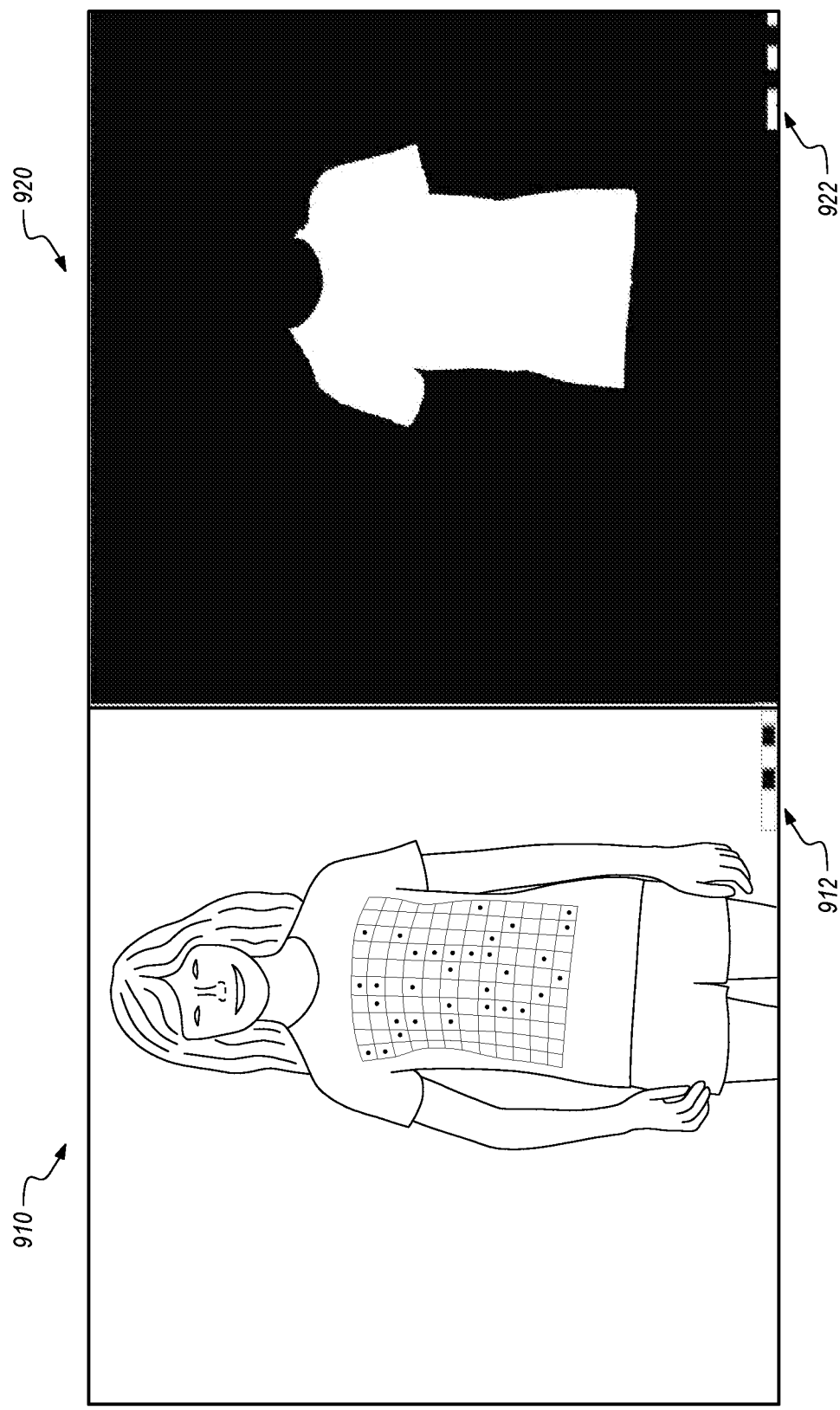
FIG. 9 depicts example video frames with example timecodes.

The resulting video frame, also referred to as a processed frame, is analyzed to identify a certain digital code embedded in the content of the frame. The certain code is also referred to as a gray code. It may be a black-and-white binary code located at a lower right corner of the video frame, as shown in FIG. 9.

A gray code allows synchronizing the processed frame with a particular frame in the video clip that has the same gray code. For example, once the processed frame is generated, the processed frame is scanned for identifying the gray code, the gray code is extracted and used to find a particular video frame in the frame sequence that has the same grade code.

Once the processed frame is synchronized with the particular video frame in the video clip, rendering of a customized frame begins. This may include morphing the processed frame with the particular video frame to generate the customized frame. The process may be performed using WebGL libraries and WebGL-based code.

Continuing with the example described above, the resulting customized frame will depict a blue t-shirt. The resulting customized frame will also depict all the warping and creases that were shown in the original t-shirt, except that in the customized frame they are in different shades of blue.

VI. Example Markup

A video frame that is received by a server computer may depict a piece of clothing, and the piece of clothing may have embedded markups. A markup is a grid that includes grid squares. Some of the grid squares include dots, some other squares are empty. The combination of the dots in the grid creates a unique pattern.

Figure 3:
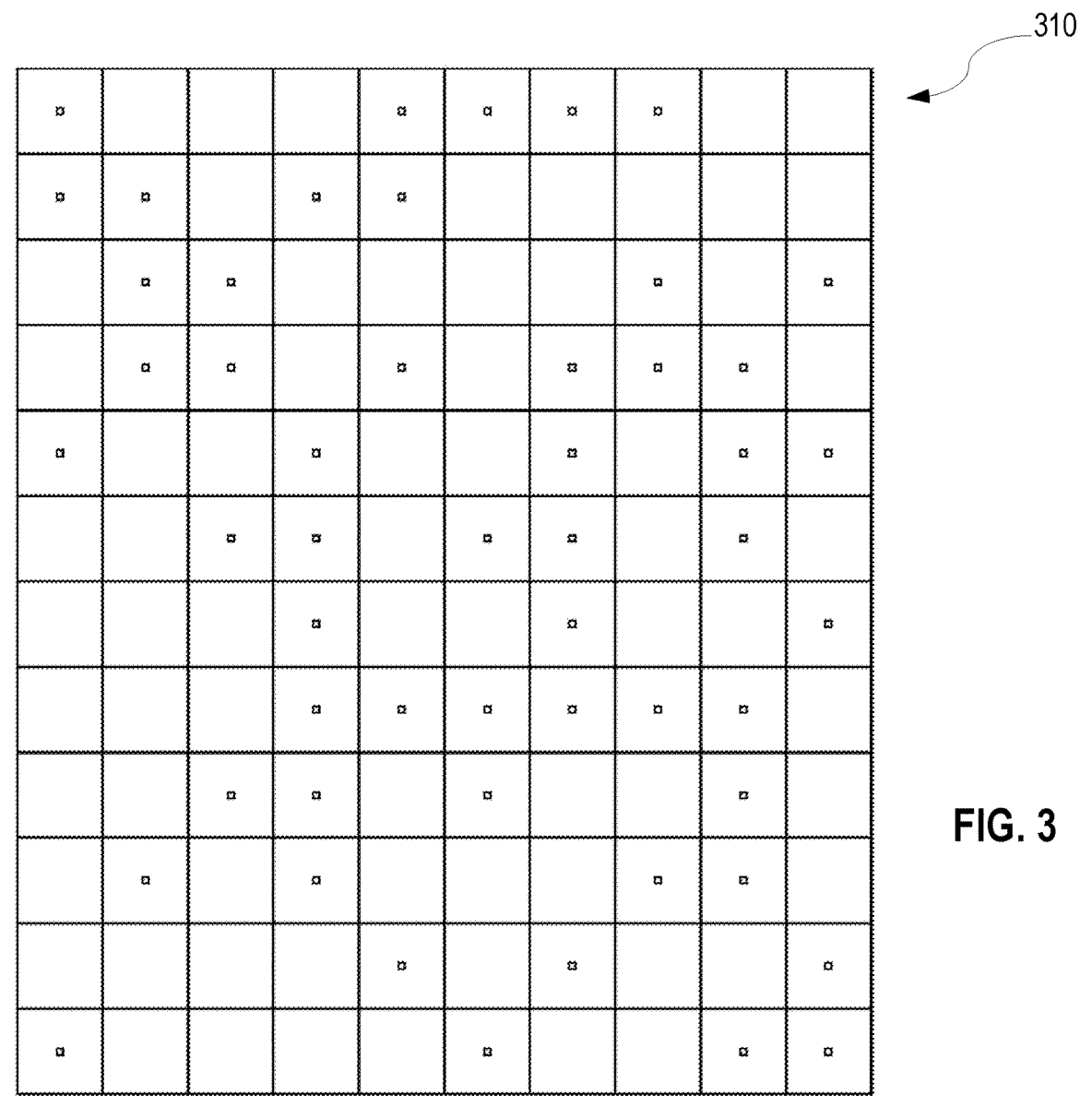

FIG. 3 depicts an example markup 310. Example markup 310 is a grid that includes 12 rows and 10 columns; however, sizes of markups may vary.

One of the unique properties of a markup is that the markup includes a unique pattern. A markup grid may be designed in such a way so that any 4×4 subset of squares within the grid is unique. Even if a filter only finds a corner of the grid, the corner is sufficiently unique to guess a location of the entire grid. Based on the found corner, the filter may make a guess about the other portions of the pattern and the entire markup.

In a depicted example, the pattern of dots in any 4×4 area of any part of the grid is distinctive. Hence, one may determine whether a dot is part of a markup by determining whether the dot is part of any 4×4 area. For example, a filter may be used to scan a video frame to look for dots. Once at least some dots are found, the filter may determine whether the dots form at least a part of a pattern. If they do, the filter may match the identified part of the pattern with reference patterns. That way the filter may identify the entire pattern, and identify a location of the pattern in the markup and a location of the markup in the video frame. The pattern may be deformed and warped around for example, a person who is modeling the t-shirt. Therefore, it might be hard to identify the entire pattern. However, if some dots are found, locations of the remaining dots may be guessed, and the location of the markup may be approximated.

Markups may be used to identify locations of certain objects imprinted on objects depicted in video frames. Markups may also be used to identify certain colors for colored regions in the objects depicted in the frames.

A location of the markup within a frame may be determined using a set of tuned filters. The set may include one or more filters that are configured to recognize the markups depicted in the frame. Based on the recognized markups and a predefined, so called, color shed, a filter may determine one or more colored regions and/or segment in the frame. For example, one filter may be used to recognize a markup in a video frame, and another filter may be used to the colors and the color regions in the frame to which the colors are to be applied. The information about the colors and the color regions may be stored in a data vector.

VII. Example Video Frame Containing an Example Markup

FIG. 4 depicts an example video frame 410 containing an example markup 430. The example in FIG. 4 depicts a person who is modeling a t-shirt 420. T-shirt 420 has a markup 430 embedded in a frontal portion of t-shirt 420. Markup 430 is a rectangle that has a grid with rows and columns. It also has dots spread throughout markup 430. Warping and creases in markup 430 corresponds to warping and creases in t-shirt 420.

A filter may be used to scan video frame 410 and to detect markup 430 shown in the frame. Upon detecting markup 430, the same filter, or another filter, may be used to identify a region marked by markup 430. In the depicted example, that region may include the entire t-shirt 420. The same filter, or another filter, may be used to analyze the identified region, and determine a set of vertices and/or polygons that may be used to draw t-shirt 420 to capture the shape of the t-shirt, including the warping and the creases of the fabric. Another filter may be used to determine the color, or colors, to be used to customize t-shirt 420. Other filter may be used to generate vector data. The vector data may include associations, or bindings, between the vertices, polygons and the colors to be used to customize t-shirt 420.

VIII. Example Video Frame with a Segmented Background

Segmenting a background in a video frame includes identifying pixels in the frame that belong to a background region in the frame. The segmenting also includes assigning one color to pixels that are included in the background region, and assigning another color to pixels that are not included in the background region. Selection of the colors depends on the implementation. For example, segmenting a background may include assigning a white color to the background pixels and a black color to the remaining pixels in the frame. Other implementation may use other color schemes.

FIG. 5 depicts an example video frame with a segmented background. The depicted example shows a frame 510 that contains a background 520. Frame 510 also depicts a person modeling a t-shirt 530. Frame 510 was generated from frame 410 in FIG. 4 by identifying pixels that correspond to background 520, replacing colors assigned to those pixels with a white color, and replacing colors of all remaining pixels with a black color. Therefore, background 520 in frame 510 is white, and the silhouette of the person modeling the t-shirt is black.

IX. Example Video Frame with a Segmented Product Area

Segmenting a product area in a video frame is opposite to segmenting a background in a video frame. It includes identifying pixels in the frame that belong to a product region in the frame, assigning one color to pixels that are included in the product region, and assigning another color to pixels that are not included in the product region. Selection of the colors depends on the implementation. For example, segmenting a product region may include assigning a white color to the product area pixels and a black color to the remaining pixels in the frame. Other implementation may use other color schemes.

FIG. 6 depicts an example video frame with a segmented product area. The depicted example shows a frame 610 that contains a background 620. Frame 610 also depicts a product area 630. Frame 610 was generated from frame 410 in FIG. 4 by identifying pixels that correspond to product area 630, replacing colors assigned to those pixels with a white color, and replacing colors of all remaining pixels with a black color. Therefore, product area 630 in frame 610 is white, and background 620 is black.

X. Example Video Frame with a Reconstructed Markup

Figure 7:
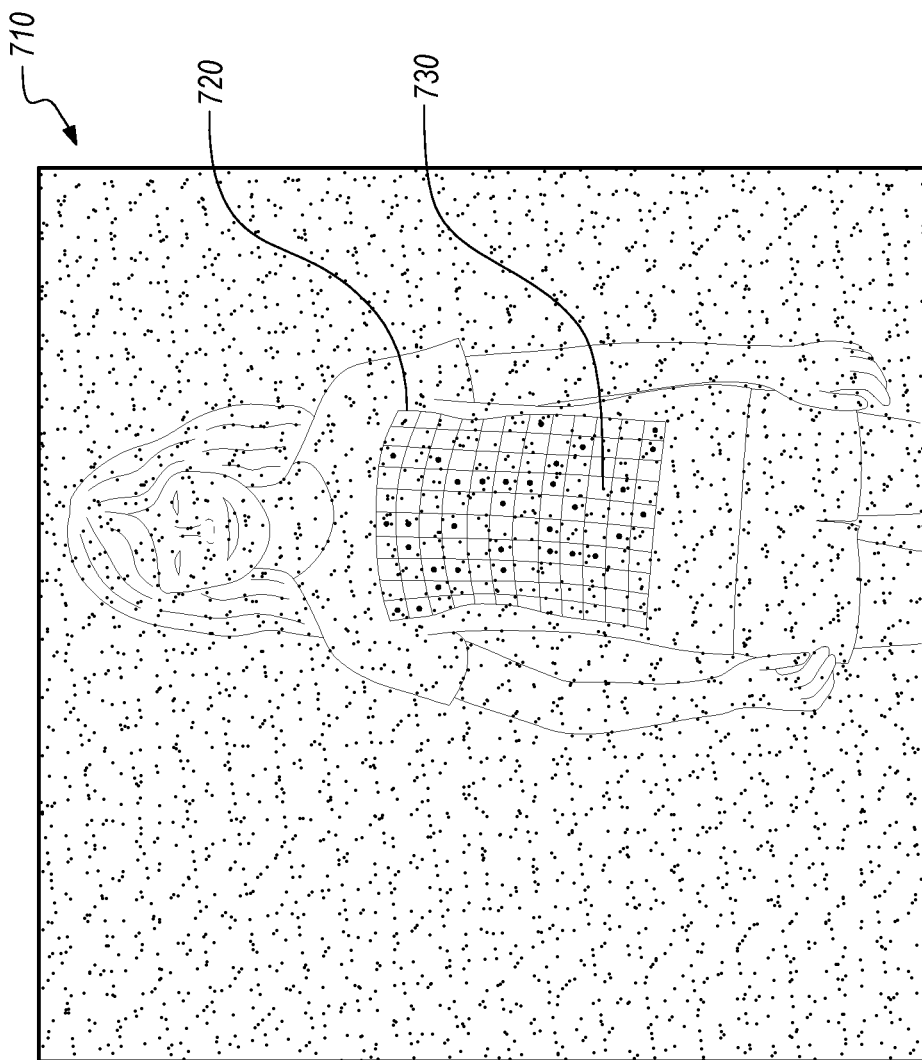
FIG. 7 depicts an example video frame with a reconstructed example markup.

FIG. 7 depicts an example video frame with a reconstructed example markup. The depicted example shows a frame 710 that depicts a product area 720. Product area 720 was analyzed by one or more filters to identify at least a portion of a markup. It is possible that, due to warping and creases of a t-shirt depicted in product area 720, only a portion of the markup was identified. However, due to the unique properties of each 4×4 sub-grid in a markup, if at least a portion of the markup is identified, the remaining portions of the markup can be approximated. The reconstructed markup is depicted in FIG. 7 as a markup 730.

XI. Example Video Frame Before an Example Markup is Removed

Figure 8:
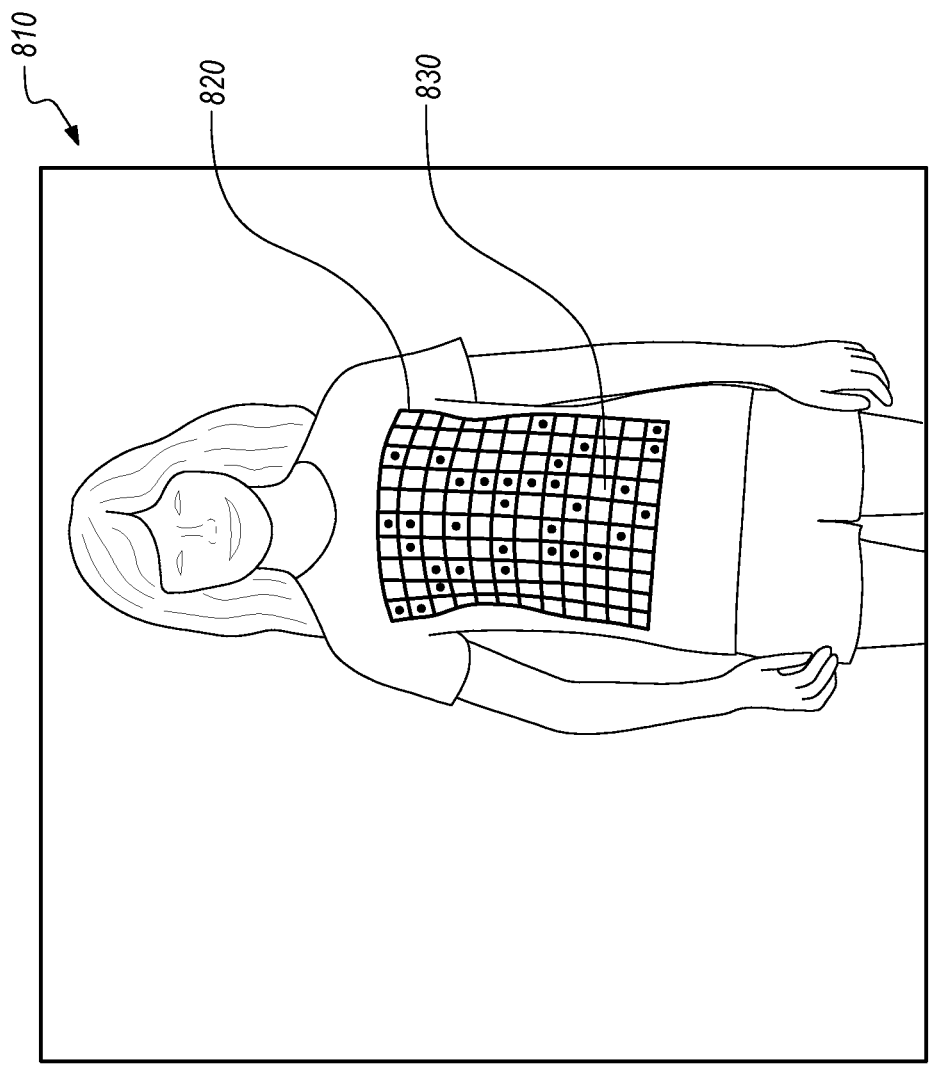
FIG. 8 depicts an example video frame before an example markup is removed.

FIG. 8 depicts an example video frame before an example markup is removed. The depicted example shows a frame 810 that depicts a product area 820. Product area 820 includes a reconstructed markup 830. Reconstructed markup 830 may be used to determine a product region of an object that is to be customized. Once the product region and the object are determined, reconstructed markup 830 may be removed.

Once reconstructed markup 830 is removed, the product area may be customized as described in FIG. 2. Once the product area is customized, a mask based on segmented product area may be applied to extract an image of the customized product from frame 810.

XII. Example Video Frames with Example Timecodes

FIG. 9 depicts example video frames with example timecodes. The example video frames include a particular video frame 910 and a customized video frame 920. Both frames include gray codes 912 and 922, respectively, and in the respective right corners. Typically, codes 912, 922 include just a few pixels. However, to make the codes visible in FIG. 9, codes 912, 922 have been enlarged.

Codes 912, 922 are used to synchronize customized video frame 920 with particular video frame 910, which was used to generate customized video frame 920. The frames need to be synchronized because by the time customized video frame 920 is generated, it is unknown whether particular video frame 910 is queued for displaying. Before customized frame 920 may be included in the video frame sequence, a client computer needs to find, in the original video frame sequence, particular video frame 910 that was used to generate customized video frame 920. Codes 912 and 922 are used for that very purpose. Since the codes correspond to the frame sequence numbers and the codes are small, scanning the frames in the video frame sequence for the codes may be performed quickly and efficiently.

XIII. Benefits of Certain Embodiments

One benefit of embodiments is the ability to customize the products depicted in the interactive video at a rapid speed. This is achievable because the information exchanged between the server computer and the client computer is small. The server computer transmits to the client computer only a customization prescription, such as a video data file and customization instructions, for customizing the appearance of products featured in the video, and the transmitted file and instructions are relatively small. Transmitting the prescription from the server computer to the client computer requires less bandwidth than sending the entire customized video content. Since the customization of the video may be performed at a rapid speed, the technique may be widely implemented in performance-sensitive applications, such as gaming applications.

Another benefit of embodiments is the ability to separate non-customized content of an interactive video from customized content of the interactive video. Large, non-customized content may be cached on the client computer, and the customized content may be provided by a server computer to the client efficiently. Frames of the customized content may be overlaid over the frames of the non-customized content on the client side, and the resulting customized interactive video may be efficiently rendered on the client's display.

Still another improvement provided by embodiments is code-based, frame synchronization, which allows synchronizing the frames of the non-customized content with the frames with the customized content. The synchronization of the frames may be implemented using codes embedded in the frames. The codes may be used to match a frame with the customized content with a frame of the non-customized content. The code-matching approach allows synchronizing the frames regardless of latency between them.

Furthermore, embodiments improve upon the approaches that require building geometry for 3D models and animating the 3D models. Creating and animating the 3D models is time consuming and computationally expensive. In sharp contrast, the presented approach allows generating high-quality, customized content without animating the models.

XIV. Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 10:
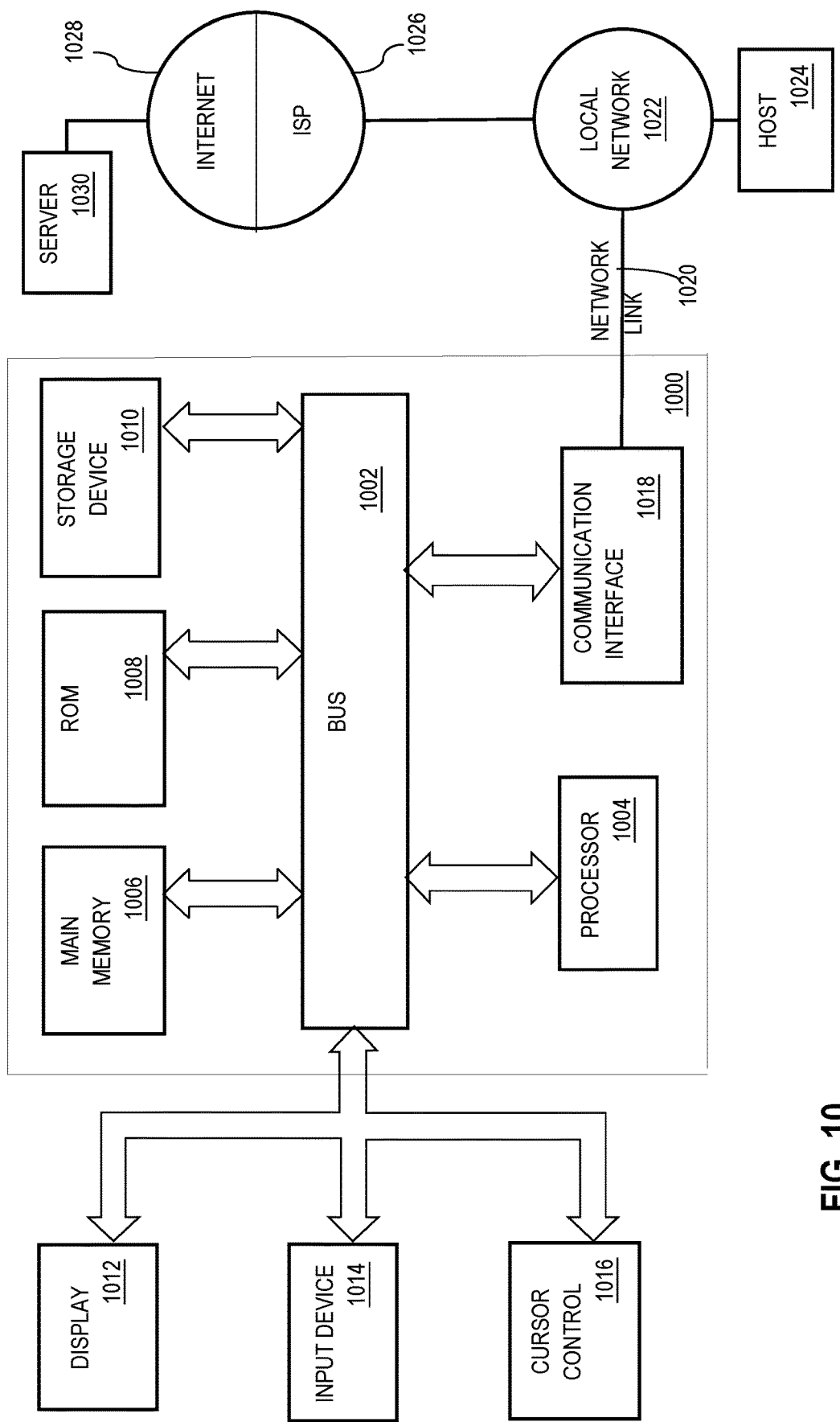
FIG. 10 is a block diagram that illustrates a computer system with which the techniques herein may be implemented.

For example, FIG. 10 is a block diagram that illustrates a computer system 1000 upon which an embodiment of the approach may be implemented. Computer system 1000 includes a bus 1002 or other communication mechanism for communicating information, and a hardware processor 1004 coupled with bus 1002 for processing information. Hardware processor 1004 may be, for example, a general-purpose microprocessor.

Computer system 1000 also includes a main memory 1006, such as a random-access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk, optical disk, or solid-state drive is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1010. Volatile media includes dynamic memory, such as main memory 1006. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid-state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world-wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

In the foregoing specification, embodiments of the approach have been described with reference to numerous specific details that may vary from implementation to implementation. The specification and drawings are, accordingly, to be regarded in an illustrative rather than a restrictive sense. The sole and exclusive indicator of the scope of the approach, and what is intended by the applicants to be the scope of the approach, is the literal and equivalent scope of the set of claims that issue from this application, in the specific form in which such claims issue, including any subsequent correction.

XV. Example Code Instructions

The following is an example set of instructions for partitioning an image into a plurality of regions. At least a portion of the instructions may be included in one embodiment of markup region identification instructions 210.

What is claimed is:

1. A method for customizing a video frame sequence and displaying a customized video frame sequence, the method comprising:

for each video frame from a plurality of video frames:
processing, by a client computer, a video frame, from the plurality of video frames, to generate a processed video frame by executing customization instructions on a video data file and the video frame, from the plurality of video frames;
synchronizing the processed video frame with the video frame, from the plurality of video frames;
wherein the processed video frame is synchronized with the video frame in the plurality of video frames by identifying a certain code depicted at a certain location in the processed video frame and searching for the video frame, in the plurality of video frames, that has the certain code;
generating a morphed video frame by morphing the processed video frame synchronized with the video frame;
displaying the morphed video frame on a display device.

2. The method of claim 1,
wherein the client computer executes the customization instructions on the video data file and the video frame to generate a customized object.

3. The method of claim 2, wherein the customized object is generated by reading the video data file, instantiating geometry with morph targets, selecting shaders for the geometry, and generating the customized object as prescribed in the customization instructions.

4. The method of claim 2, wherein the certain code is one or more of: a graphical code, a binary code, or a black-and-white representation of a frame number.

5. The method of claim 2, wherein synchronizing the processed video frame with a video frame allows pairing the processed video frame with the video frame from the plurality of video frames and morphing the processed video frame with the video frame.

6. The method of claim 2, wherein morphing the processed video frame synchronized with the video frame comprises overlaying the processed video frame over a video frame.

7. The method of claim 2, wherein the client computer receives the video data file, the customization instructions, and a video frame file directly from a server computer.

8. The method of claim 2, wherein the client computer receives a hyperlink from a server computer and downloads the video data file, the customization instructions, and a video frame file from a location indicated by the hyperlink.

9. The method of claim 2, wherein the processed video frame is further generated by: adding a background around the customized object and saving data representing a depiction of the background and the customized object as the processed video frame.

10. The method of claim 2, wherein the video data file is generated for the plurality of video frames and is used to mask one or more regions in frames of the plurality of video frames in which the customized object is depicted;
wherein the video data file is used to generate the customized object that is overlaid over the one or more regions in the frames of the plurality of video frames;
wherein the video data file is a JavaScript Object Notation (JSON) file.

11. A non-transitory computer-readable storage medium storing one or more sequences of instructions which, when executed by one or more computer processors, cause the one or more computer processors to perform:
for each video frame from a plurality of video frames:
processing, by a client computer, a video frame, from the plurality of video frames, to generate a processed video frame by executing customization instructions on a video data file and the video frame, from the plurality of video frames;
synchronizing the processed video frame with the video frame, from the plurality of video frames;
wherein the processed video frame is synchronized with the video frame in the plurality of video frames by identifying a certain code depicted at a certain location in the processed video frame and searching for the video frame, in the plurality of video frames, that has the certain code;
generating a morphed video frame by morphing the processed video frame synchronized with the video frame; and
displaying the morphed video frame on a display device.

12. The non-transitory computer-readable storage medium of claim 11,
wherein the client computer executes the customization instructions on the video data file and the video frame to generate a customized object.

13. The non-transitory computer-readable storage medium of claim 12, wherein the customized object is generated by reading the video data file, instantiating geometry with morph targets, selecting shaders for the geometry, and generating the customized object as prescribed in the customization instructions.

14. The non-transitory computer-readable storage medium claim 12, wherein the certain code is one or more of: a graphical code, a binary code, or a black-and-white representation of a frame number.

15. The non-transitory computer-readable storage medium of claim 12, wherein synchronizing the processed video frame with a video frame allows pairing the processed video frame with the video frame from the plurality of video frames and morphing the processed video frame with the video frame.

16. The non-transitory computer-readable storage medium of claim 12, wherein morphing the processed video frame synchronized with the video frame comprises overlaying the processed video frame over a video frame.

17. The non-transitory computer-readable storage medium of claim 12, wherein the client computer receives the video data file, the customization instructions, and a video frame file directly from a server computer.

18. The non-transitory computer-readable storage medium of claim 12, wherein the client computer receives a hyperlink from a server computer and downloads the video data file, the customization instructions, and a video frame file from a location indicated by the hyperlink.

19. The non-transitory computer-readable storage medium of claim 12, wherein the processed video frame is further generated by: adding a background around the customized object and saving data representing a depiction of the background and the customized object as the processed video frame.

20. The non-transitory computer-readable storage medium of claim 12, wherein the video data file is generated for the plurality of video frames and is used to mask one or more regions in frames of the plurality of video frames in which the customized object is depicted;
wherein the video data file is used to generate the customized object that is overlaid over the one or more regions in the frames of the plurality of video frames;
wherein the video data file is a JavaScript Object Notation (JSON) file.

* * * * *